(12) United States Patent
Kwak et al.

(10) Patent No.: US 8,179,369 B2
(45) Date of Patent: May 15, 2012

(54) OPTICAL NAVIGATION DEVICE AND METHOD FOR COMPENSATING FOR OFFSET IN OPTICAL NAVIGATION DEVICE

(75) Inventors: Jong-Taek Kwak, Yongin-si (KR); Bang-Won Lee, Yongin-si (KR); Young-Ho Shin, Yongin-si (KR)

(73) Assignee: Atlab Inc. (KR)

( * ) Notice: Subject to any disclaimer, the term of this patent is extended or adjusted under 35 U.S.C. 154(b) by 1336 days.

(21) Appl. No.: 11/778,891

(22) Filed: Jul. 17, 2007

(65) Prior Publication Data

US 2008/0043223 A1 Feb. 21, 2008

(30) Foreign Application Priority Data

Aug. 18, 2006 (KR) .................. 10-2006-0078245

(51) Int. Cl.
*G09G 5/08* (2006.01)
(52) U.S. Cl. ........ 345/166; 345/156; 345/157; 345/163; 250/221
(58) Field of Classification Search .......... 345/156–167; 250/208.1, 221
See application file for complete search history.

(56) References Cited

U.S. PATENT DOCUMENTS

| | | | |
|---|---|---|---|
| 5,404,430 A * | 4/1995 | Tashiro et al. ............... | 345/440 |
| 6,215,519 B1 * | 4/2001 | Nayar et al. ................ | 348/159 |
| 6,411,278 B1 | 6/2002 | Kage et al. | |
| 6,509,893 B1 * | 1/2003 | Akhlagi et al. ............. | 345/179 |
| 6,597,443 B2 * | 7/2003 | Boman ................... | 356/139.03 |
| 7,161,626 B1 * | 1/2007 | Nara ............................ | 348/243 |
| 7,248,345 B2 * | 7/2007 | Todoroff et al. ............ | 356/28 |
| 7,295,186 B2 * | 11/2007 | Brosnan .................... | 345/166 |
| 7,342,570 B2 * | 3/2008 | Lin et al. .................... | 345/166 |
| 7,800,594 B2 * | 9/2010 | Nakamura et al. .......... | 345/175 |
| 2001/0026631 A1 * | 10/2001 | Slocum et al. .............. | 382/115 |
| 2002/0126915 A1 * | 9/2002 | Lai et al. .................... | 382/296 |
| 2002/0167486 A1 * | 11/2002 | Tan et al. .................... | 345/156 |
| 2003/0026485 A1 * | 2/2003 | Gotsman et al. ............ | 382/224 |
| 2003/0053660 A1 * | 3/2003 | Heyden ....................... | 382/103 |
| 2003/0085878 A1 | 5/2003 | Luo | |

(Continued)

FOREIGN PATENT DOCUMENTS

KR 1020040045174 A 6/2004

(Continued)

OTHER PUBLICATIONS

Taiwan Office Action—Taiwan Patent Application No. 096124320 issued Oct. 27, 2010, citing US2003/0085878, US6411278, US2005/0165517 and US2005/0231484.

*Primary Examiner* — Lun-Yi Lao
*Assistant Examiner* — Gene W Lee
(74) *Attorney, Agent, or Firm* — Cantor Colburn LLP

(57) ABSTRACT

Provided are an optical navigation device and a method for compensating for an offset in the optical navigation device. The optical navigation device includes: an image input unit for emitting light, receiving light reflected from a working surface to generate an analog image signal, converting the analog image signal into a digital image signal, and outputting the digital image signal; a delta image generator for generating a cumulative average of digital image signals of respective pixels and subtracting the cumulative average from the digital image signals in the respective pixels to generate a delta image signal; and a motion value calculator for calculating a motion value using the delta image signal.

20 Claims, 11 Drawing Sheets

U.S. PATENT DOCUMENTS

| | | | |
|---|---|---|---|
| 2005/0001817 A1* | 1/2005 | Lauffenburger et al. | 345/166 |
| 2005/0062720 A1* | 3/2005 | Rotzoll et al. | 345/166 |
| 2005/0139944 A1* | 6/2005 | Lin et al. | 257/432 |
| 2005/0151724 A1* | 7/2005 | Lin et al. | 345/166 |
| 2005/0165517 A1 | 7/2005 | Reich | |
| 2005/0231484 A1 | 10/2005 | Gordon et al. | |
| 2006/0022116 A1* | 2/2006 | Wang | 250/208.1 |
| 2006/0023970 A1* | 2/2006 | Wang | 382/312 |
| 2006/0139458 A1* | 6/2006 | Chou | 348/208.1 |
| 2006/0238776 A1* | 10/2006 | Chu et al. | 356/614 |
| 2007/0242040 A1* | 10/2007 | Ullrich et al. | 345/157 |

FOREIGN PATENT DOCUMENTS

| | | |
|---|---|---|
| KR | 1020050032800 A | 4/2005 |

\* cited by examiner

F0: 7×6 grid of 1s

F1: 7×6 grid of 1s

F2: 7×6 grid of 1s

F3: 7×6 grid of 1s

F4: 7×6 grid of 1s

F5: 7×6 grid of 1s

| 1 | 3 | 5 | 7 | 9 | 11 | 13 |
|---|---|---|---|---|----|----|
| 1 | 3 | 5 | 7 | 9 | 11 | 13 |
| 1 | 3 | 5 | 7 | 9 | 11 | 13 |
| 2 | 4 | 6 | 8 | 10 | 12 | 14 |
| 1 | 3 | 5 | 7 | 9 | 11 | 13 |
| 1 | 3 | 5 | 7 | 9 | 11 | 13 |
| 1 | 3 | 5 | 7 | 9 | 11 | 13 |

X1

| 1 | 3 | 5 | 7 | 9 | 11 | 13 |
|---|---|---|---|---|----|----|
| 2 | 3 | 5 | 7 | 9 | 11 | 13 |
| 2 | 3 | 5 | 7 | 9 | 11 | 13 |
| 3 | 4 | 6 | 8 | 10 | 11 | 14 |
| 2 | 3 | 5 | 7 | 9 | 11 | 13 |
| 2 | 3 | 5 | 7 | 9 | 11 | 13 |
| 2 | 3 | 5 | 7 | 9 | 11 | 13 |

X2

| 1 | 3 | 5 | 7 | 9 | 11 | 13 |
|---|---|---|---|---|----|----|
| 1 | 4 | 5 | 7 | 9 | 11 | 13 |
| 1 | 4 | 5 | 7 | 9 | 11 | 13 |
| 2 | 5 | 6 | 8 | 10 | 12 | 14 |
| 1 | 4 | 5 | 7 | 9 | 11 | 13 |
| 1 | 4 | 5 | 7 | 9 | 11 | 13 |
| 1 | 3 | 5 | 7 | 9 | 11 | 13 |

X3

| 1 | 3 | 5 | 7 | 9 | 11 | 13 |
|---|---|---|---|---|----|----|
| 1 | 3 | 6 | 7 | 9 | 11 | 13 |
| 1 | 3 | 6 | 7 | 9 | 11 | 13 |
| 2 | 3 | 7 | 8 | 10 | 12 | 14 |
| 1 | 3 | 6 | 7 | 9 | 11 | 13 |
| 1 | 3 | 6 | 7 | 9 | 11 | 13 |
| 1 | 3 | 5 | 7 | 9 | 11 | 13 |

X4

| 1 | 3 | 5 | 7 | 9 | 11 | 13 |
|---|---|---|---|---|----|----|
| 1 | 3 | 5 | 8 | 9 | 11 | 13 |
| 1 | 3 | 5 | 8 | 9 | 11 | 13 |
| 2 | 4 | 6 | 9 | 10 | 12 | 14 |
| 1 | 3 | 5 | 8 | 9 | 11 | 13 |
| 1 | 3 | 5 | 8 | 9 | 11 | 13 |
| 1 | 3 | 5 | 7 | 9 | 11 | 13 |

X5

| 1 | 3 | 5 | 7 | 9 | 11 | 13 |
|---|---|---|---|---|----|----|
| 1 | 3 | 5 | 7 | 10 | 11 | 13 |
| 1 | 3 | 5 | 7 | 10 | 11 | 13 |
| 2 | 4 | 6 | 8 | 9 | 12 | 14 |
| 1 | 3 | 5 | 7 | 10 | 11 | 13 |
| 1 | 3 | 5 | 7 | 10 | 11 | 13 |
| 1 | 3 | 5 | 7 | 9 | 11 | 13 |

FIG.6B

AVG0

| 1.00 | 3.00 | 5.00 | 7.00 | 9.00 | 11.00 | 13.00 |
|---|---|---|---|---|---|---|
| 1.00 | 3.00 | 5.00 | 7.00 | 9.00 | 11.00 | 13.00 |
| 1.00 | 3.00 | 5.00 | 7.00 | 9.00 | 11.00 | 13.00 |
| 2.00 | 4.00 | 6.00 | 8.00 | 10.00 | 12.00 | 14.00 |
| 1.00 | 3.00 | 5.00 | 7.00 | 9.00 | 11.00 | 13.00 |
| 1.00 | 3.00 | 5.00 | 7.00 | 9.00 | 11.00 | 13.00 |
| 1.00 | 3.00 | 5.00 | 7.00 | 9.00 | 11.00 | 13.00 |

AVG1

| 1.00 | 3.00 | 5.00 | 7.00 | 9.00 | 11.00 | 13.00 |
|---|---|---|---|---|---|---|
| 1.50 | 3.00 | 5.00 | 7.00 | 9.00 | 11.00 | 13.00 |
| 1.50 | 3.00 | 5.00 | 7.00 | 9.00 | 11.00 | 13.00 |
| 2.50 | 4.00 | 6.00 | 8.00 | 10.00 | 11.50 | 14.00 |
| 1.50 | 3.00 | 5.00 | 7.00 | 9.00 | 11.00 | 13.00 |
| 1.50 | 3.00 | 5.00 | 7.00 | 9.00 | 11.00 | 13.00 |
| 1.50 | 3.00 | 5.00 | 7.00 | 9.00 | 11.00 | 13.00 |

AVG2

| 1.00 | 3.00 | 5.00 | 7.00 | 9.00 | 11.00 | 13.00 |
|---|---|---|---|---|---|---|
| 1.25 | 3.50 | 5.00 | 7.00 | 9.00 | 11.00 | 13.00 |
| 1.25 | 3.50 | 5.00 | 7.00 | 9.00 | 11.00 | 13.00 |
| 2.25 | 4.50 | 6.00 | 8.00 | 10.00 | 11.75 | 14.00 |
| 1.25 | 3.50 | 5.00 | 7.00 | 9.00 | 11.00 | 13.00 |
| 1.25 | 3.50 | 5.00 | 7.00 | 9.00 | 11.00 | 13.00 |
| 1.25 | 3.00 | 5.00 | 7.00 | 9.00 | 11.00 | 13.00 |

AVG3

| 1.00 | 3.00 | 5.00 | 7.00 | 9.00 | 11.00 | 13.00 |
|---|---|---|---|---|---|---|
| 1.13 | 3.25 | 5.50 | 7.00 | 9.00 | 11.00 | 13.00 |
| 1.13 | 3.25 | 5.50 | 7.00 | 9.00 | 11.00 | 13.00 |
| 2.13 | 3.75 | 6.50 | 8.00 | 10.00 | 11.80 | 14.00 |
| 1.13 | 3.25 | 5.50 | 7.00 | 9.00 | 11.00 | 13.00 |
| 1.13 | 3.25 | 5.50 | 7.00 | 9.00 | 11.00 | 13.00 |
| 1.13 | 3.00 | 5.00 | 7.00 | 9.00 | 11.00 | 13.00 |

AVG4

| 1.00 | 3.00 | 5.00 | 7.00 | 9.00 | 11.00 | 13.00 |
|---|---|---|---|---|---|---|
| 1.06 | 3.13 | 5.25 | 7.50 | 9.00 | 11.00 | 13.00 |
| 1.06 | 3.13 | 5.25 | 7.50 | 9.00 | 11.00 | 13.00 |
| 2.06 | 3.88 | 6.25 | 8.50 | 10.00 | 11.94 | 14.00 |
| 1.06 | 3.13 | 5.25 | 7.50 | 9.00 | 11.00 | 13.00 |
| 1.06 | 3.13 | 5.25 | 7.50 | 9.00 | 11.00 | 13.00 |
| 1.06 | 3.00 | 5.00 | 7.00 | 9.00 | 11.00 | 13.00 |

AVG5

| 1.00 | 3.00 | 5.00 | 7.00 | 9.00 | 11.00 | 13.00 |
|---|---|---|---|---|---|---|
| 1.03 | 3.06 | 5.13 | 7.25 | 9.50 | 11.00 | 13.00 |
| 1.03 | 3.06 | 5.13 | 7.25 | 9.50 | 11.00 | 13.00 |
| 1.03 | 3.94 | 6.13 | 8.25 | 9.50 | 11.97 | 14.00 |
| 1.03 | 3.06 | 5.13 | 7.25 | 9.50 | 11.00 | 13.00 |
| 1.03 | 3.06 | 5.13 | 7.25 | 9.50 | 11.00 | 13.00 |
| 1.03 | 3.00 | 5.00 | 7.00 | 9.00 | 11.00 | 13.00 |

| 2.00 | 2.00 | 2.00 | 2.00 | 2.00 | 2.00 | 2.00 |
|---|---|---|---|---|---|---|
| 2.00 | 2.00 | 2.00 | 2.00 | 2.00 | 2.00 | 2.00 |
| 2.00 | 2.00 | 2.00 | 2.00 | 2.00 | 2.00 | 2.00 |
| 2.00 | 2.00 | 2.00 | 2.00 | 2.00 | 2.00 | 2.00 |
| 2.00 | 2.50 | 2.50 | 2.50 | 2.50 | 2.50 | 2.00 |
| 2.00 | 2.00 | 2.00 | 2.00 | 2.00 | 2.00 | 2.00 |
| 2.00 | 1.75 | 1.75 | 1.75 | 1.75 | 1.75 | 1.75 |

D1

| 2.00 | 2.00 | 2.00 | 2.00 | 2.00 | 2.00 | 2.00 |
|---|---|---|---|---|---|---|
| 2.00 | 2.00 | 2.00 | 1.50 | 2.00 | 2.00 | 2.00 |
| 2.00 | 2.00 | 2.00 | 2.00 | 2.00 | 2.00 | 2.00 |
| 2.00 | 2.00 | 2.00 | 2.00 | 2.00 | 2.00 | 2.00 |
| 2.00 | 2.00 | 2.00 | 2.00 | 2.00 | 2.00 | 2.00 |
| 2.00 | 2.00 | 2.00 | 2.00 | 2.00 | 2.00 | 2.00 |
| 2.00 | 2.50 | 2.50 | 2.50 | 2.50 | 2.50 | 2.50 |

D2

| 2.00 | 2.00 | 2.00 | 2.00 | 2.00 | 2.00 | 2.00 |
|---|---|---|---|---|---|---|
| 2.00 | 2.00 | 2.00 | 2.25 | 2.00 | 2.00 | 2.00 |
| 2.00 | 2.00 | 2.00 | 2.00 | 2.00 | 2.00 | 2.00 |
| 2.00 | 2.00 | 2.00 | 2.00 | 2.00 | 2.00 | 2.00 |
| 2.00 | 2.50 | 2.50 | 2.50 | 2.50 | 2.50 | 2.00 |
| 2.00 | 2.00 | 2.00 | 2.00 | 2.00 | 2.00 | 2.00 |
| 1.75 | 1.75 | 1.75 | 1.75 | 1.75 | 1.75 | 1.75 |

D3

| 2.00 | 2.00 | 2.00 | 2.00 | 2.00 | 2.00 | 2.00 |
|---|---|---|---|---|---|---|
| 2.00 | 2.00 | 2.00 | 2.13 | 2.00 | 2.00 | 2.00 |
| 2.00 | 2.00 | 2.00 | 2.00 | 2.00 | 2.00 | 2.00 |
| 2.50 | 2.50 | 2.50 | 2.50 | 2.50 | 2.50 | 2.00 |
| 1.75 | 1.75 | 1.75 | 1.75 | 1.75 | 1.75 | 2.00 |
| 1.88 | 1.88 | 1.88 | 1.88 | 1.88 | 1.88 | 2.00 |
| 1.88 | 1.88 | 1.88 | 1.88 | 1.88 | 1.88 | 1.88 |

D4

| 2.00 | 2.00 | 2.00 | 2.00 | 2.00 | 2.00 | 2.00 |
|---|---|---|---|---|---|---|
| 2.00 | 2.00 | 2.00 | 2.06 | 2.00 | 2.00 | 2.00 |
| 2.00 | 2.00 | 2.00 | 2.00 | 2.00 | 2.00 | 2.00 |
| 2.00 | 2.50 | 2.50 | 2.50 | 2.50 | 2.50 | 2.00 |
| 2.00 | 1.75 | 1.75 | 1.75 | 1.75 | 1.75 | 2.00 |
| 2.00 | 1.88 | 1.88 | 2.13 | 1.88 | 1.88 | 2.00 |
| 2.00 | 1.94 | 1.94 | 1.94 | 1.94 | 1.94 | 1.94 |

D5

| 2.00 | 2.00 | 2.00 | 2.00 | 2.00 | 2.00 | 2.00 |
|---|---|---|---|---|---|---|
| 2.00 | 2.00 | 2.00 | 2.03 | 2.00 | 2.00 | 2.00 |
| 2.00 | 2.50 | 2.50 | 1.50 | 2.50 | 2.50 | 2.00 |
| 2.00 | 1.75 | 1.75 | 1.75 | 1.75 | 1.75 | 2.00 |
| 2.00 | 1.88 | 1.88 | 1.88 | 1.88 | 1.88 | 2.00 |
| 2.00 | 1.97 | 1.97 | 2.06 | 1.94 | 1.94 | 2.00 |
| 2.00 | 1.97 | 1.97 | 1.97 | 1.97 | 1.97 | 1.97 |

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

DF1:

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 1 |
| 0 | 0 | 0 | 0 | 0 | 0 |
| 0 | 0 | 0 | 0 | 0 | 0 |
| 0 | 0 | 0 | 0 | 0 | 0 |

DF2:

| 0 | 0 | 0 | 0 | 0 | 0 |
|---|---|---|---|---|---|
| 1 | 0 | 0 | 0 | 0 | 0 |
| 1 | 0 | 0 | 0 | 0 | 0 |
| 1 | 0 | 0 | 0 | 1 | 0 |
| 1 | 0 | 0 | 0 | 0 | 0 |
| 1 | 0 | 0 | 0 | 0 | 0 |
| 1 | 0 | 0 | 0 | 0 | 0 |

DF3:

| 0 | 0 | 0 | 0 | 0 | 0 |
|---|---|---|---|---|---|
| 0 | 1 | 0 | 0 | 0 | 0 |
| 0 | 1 | 0 | 0 | 0 | 0 |
| 0 | 1 | 0 | 0 | 1 | 0 |
| 0 | 1 | 0 | 0 | 0 | 0 |
| 0 | 1 | 0 | 0 | 0 | 0 |
| 1 | 0 | 0 | 0 | 0 | 0 |

DF4:

| 0 | 0 | 0 | 0 | 0 | 0 |
|---|---|---|---|---|---|
| 0 | 0 | 1 | 0 | 0 | 0 |
| 0 | 0 | 1 | 0 | 0 | 0 |
| 1 | 0 | 1 | 0 | 1 | 0 |
| 0 | 0 | 1 | 0 | 0 | 0 |
| 0 | 0 | 1 | 0 | 0 | 0 |
| 1 | 0 | 0 | 0 | 0 | 0 |

DF5:

| 0 | 0 | 0 | 0 | 0 | 0 |
|---|---|---|---|---|---|
| 0 | 0 | 0 | 1 | 0 | 0 |
| 0 | 0 | 0 | 1 | 0 | 0 |
| 1 | 0 | 0 | 0 | 1 | 0 |
| 0 | 0 | 0 | 1 | 0 | 0 |
| 0 | 0 | 0 | 1 | 0 | 0 |
| 1 | 0 | 0 | 0 | 0 | 0 |

OPTICAL NAVIGATION DEVICE AND METHOD FOR COMPENSATING FOR OFFSET IN OPTICAL NAVIGATION DEVICE

This application claims the benefit of Korean Patent Application No. 2006-0078245, filed Aug. 18, 2006, the contents of which are hereby incorporated herein by reference in their entirety.

BACKGROUND OF THE INVENTION

1. Field of the Invention

The present invention relates to an optical navigation device and a method for compensating for an offset in the optical navigation device and, more particularly, to an optical navigation device for compensating for an offset using the average of images of respective pixels and a method for compensating for the offset in the optical navigation device.

2. Description of Related Art

An optical navigation device successively acquires images reflected from a subject by allowing a light source to irradiate light to a subject (or the surface of a worktable), compares a current acquired image with a previously acquired image, and calculates a motion value based on the comparison result.

FIG. 1 is a diagram illustrating an image acquiring process of an optical mouse that is an example of a conventional optical navigation device.

Referring to FIG. 1, in a conventional optical mouse 1, light 7 is emitted from a light source 8 and reflected from a subject 2. When reflected light 6 is transmitted through a lens 5, an image sensor 3 including a semiconductor chip accumulates light 4, which is transmitted through the lens 5, and acquires the image of the subject 2. The image sensor 3 includes a plurality of pixels, each of which calculates the amount of the light 4 transmitted through the lens 5, compares the pixels with one another, and senses the image of the surface of the subject 2. The optical mouse 1 compares the current image of the subject 2 with the previously acquired image thereof and calculates a motion value of the optical mouse 1.

FIG. 2 is a block diagram of a conventional optical navigation device.

Referring to FIGS. 1 and 2, light 7 is emitted from a light source 10, reflected from a subject 2, and projected onto an image sensor 20. Thus, the image sensor 20 having a plurality of pixels accumulates the projected light 4 for a sampling period, acquires the image of the subject 2, generates an analog image signal An, and outputs the analog image signal An from each of the pixels. An analog-to-digital (A/D) converter 30 receives the analog image signal An from the image sensor 20, converts the analog image signal An into a digital image signal Xn, and outputs the digital image signal Xn.

An image filter 40 filters the digital image signal Xn and outputs a filtered image Fn. When the optical navigation device is embodied by an optical mouse, a data processing speed significantly affects the performance of the device. Therefore, the conventional optical navigation device includes image filtering means for reducing the amount of images to increase the data processing speed. The image filter 40 of FIG. 2 filters a digital image signal Xn having n-bit image quality in real-time and outputs a filtered image Fn having 1-bit (or sub-n-bit) image quality.

A motion value calculator 50 calculates a correlation between the previous filtered image acquired during the previous sampling period and the current filtered image Fn and outputs a motion value MV of the optical navigation device as a position of the current filtered image Fn that is most correlated with the previous filtered image.

There may be various offsets in the above-described optical navigation device. For example, there may be offsets in the image sensor 20. Although the image sensor 20 has a plurality of pixels, the respective pixels do not exhibit the same performance. The pixels of the image sensor 20 generate electric signals in response to incident light. In this process, the electric signals generated by the respective pixels may differ with respect to the same light intensity. A difference between the electric signals generated by the pixels corresponds to a difference in gain relative to light intensity between the pixels and results from the occurrence of offsets in a process.

Another cause of offsets in the optical navigation device may be lighting offsets that occur due to the non-uniformity of light emitted from the light source 10. In the optical navigation device, light emitted from the light source 10 is reflected from the subject 2 and projected onto the image sensor 20 through a lens. However, the light emitted from the light source 10 may not be applied to all surfaces of the subject 2 at the same light intensity, and the light reflected from the subject 2 also may not be projected onto the image sensor 20 at the same light intensity through the lens. Conventionally, one skilled in the art knows that the light intensity of an optical mouse has a tolerance of about 4%.

Furthermore, some offsets of the optical navigation device occur due to foreign materials. When there are foreign materials, such as dust, in a light incidence path of the optical navigation device, light cannot be projected onto the image sensor, and thus offsets can occur.

Moreover, long-term use of the optical navigation device leads to the occurrence of offsets. As the optical navigation device is used over a long period of time, the characteristics of the light source 10, the lens, and the image sensor 20 are changed.

In addition to the offsets, the image filter 40 also affects the operation of the optical navigation device. The image filter 40 reduces the amount of acquired images in order to increase the operating speed of the optical navigation device. In this process, the loss of images caused by the offsets may occur so that a motion value of the optical navigation device cannot be precisely calculated.

FIGS. 3A and 3B are diagrams illustrating a method of filtering an image using the image filter in the conventional optical navigation device show in FIG. 2.

In FIG. 3A, each of digital images signals X0, ..., and X5 is a digital image signal Xn into which the A/D converter 30 converts an analog image signal An generated by the image sensor 20, for a predetermined period of time.

In FIG. 3B, each of filtering signals F0, ..., and F5 is a filtering signal Fn that is obtained by filtering the corresponding one of the digital image signals X0, ..., and X5 using the image filter 50.

Here, the digital image signals X0, ..., and X5 and the filtering signals F0, ..., and F5 are expressed as digital image matrices and filtering matrices, respectively, for brevity.

Referring to FIG. 3A, the digital image matrices X0, ..., and X5 are arranged in 7 rows and 7 columns. Also, the digital image matrix X0 is an initial digital image matrix in which a right column of the matrix is brighter than a left column thereof due to offsets caused by the above-described offsets of the image sensor 20, such as lighting offsets or foreign materials.

As the optical navigation device moves to the left, a predetermined pattern is formed from the left column to the right column in the digital image matrices X1, ..., and X5. Specifically, a predetermined pattern is formed in a first column in the digital image matrix X1, a predetermined pattern is formed in a second column in the digital image matrix X2, and a predetermined pattern is formed in a fifth column in the digital image matrix X5.

The image filter 40 may be of various kinds. Here, an image filter of FIG. 3B outputs the filtering matrix F0 . . . , and F5 having 1-bit image quality as the filtering signal Fn. That is, the image filter of FIG. 3B outputs "1" when a value obtained by subtracting a value of a left cell from a value of each cell of the digital image matrix X0, . . . , and X5 is greater than "0", and outputs "0" when the obtained value is less than or equal to "0".

For example, a value "1" of a cell (3, 3) of the filtering matrix F0 is found since a value "2", which is obtained by subtracting a value "5" of a cell (3, 3) of the digital image matrix X0 from a value "7" of a cell (3, 4) of the digital image matrix X0, is greater than "0".

However, as shown in the filtering matrix F0, . . . , and F5, when images are filtered using the above-described image filter 40 in the optical navigation device having offsets, a value of every cell of the filtering matrix F0, . . . , and F5 turns out to be "1" so that the optical navigation device cannot calculate the motion value MV.

It is exemplarily described above with reference to FIGS. 3A and 3B that the image filter 40 filters images by subtracting a value of the left cell from a value of each cell of the digital image matrix X0, . . . , and X5. However, even if other kinds of image filters are used, malfunctions may occur in the conventional optical navigation device owing to various offsets.

SUMMARY OF THE INVENTION

An embodiment of the invention provides an optical navigation device for compensating for an offset using the average of images of respective pixels.

Another embodiment of the invention provides a method for compensating for an offset in the above-described optical navigation device.

In one aspect, the present invention is directed to an optical navigation device including: an image input unit for emitting light, receiving light reflected from a working surface to generate an analog image signal, converting the analog image signal into a digital image signal, and outputting the digital image signal; a delta image generator for generating a cumulative average of digital image signals of respective pixels and subtracting the cumulative average from the digital image signals in the respective pixels to generate a delta image signal; and a motion value calculator for calculating a motion value using the delta image signal.

In some embodiments of the present invention, the delta image generator may include: an average operation unit for calculating the cumulative average of the digital image signals applied between two points in time to output the cumulative average; an average storage unit for storing the cumulative average output from the average operation unit to output the cumulative average to the average operation unit when a next digital image signal is applied to the average storage unit; and a delta image operation unit for subtracting the cumulative average from the digital image signal to generate the delta image signal.

The average operation unit may calculate the cumulative average of all the digital image signals applied between a point in time at which a predetermined time elapses after the digital image signal is applied and a point in time at which a current digital image signal is applied.

The average operation unit may calculate the cumulative average of all the digital image signals applied between a point in time at which a predetermined time elapses after the digital image signal is applied and a point in time at which a predetermined number of digital image signals are applied.

The average operation unit may calculate the cumulative average of all the digital image signals applied between a point in time at which the current digital image signal is applied and a point in time at which a predetermined number of previous digital image signals are applied.

The average operation unit may weight a weight coefficient to the respective digital image signals to generate the cumulative average.

The average operation unit may generate a new cumulative average using some values of the digital image signal and the cumulative average.

In other embodiments of the present invention, the delta image generator may include: a pattern determiner for determining a pattern of the digital image signal, dividing the digital image signals according to the pattern to output the digital image signals, and outputting a selection signal; an average operation unit including a plurality of average operation storage units, and calculating and storing a cumulative average of digital image signals having the corresponding pattern in response to the digital image signals that are divided by the pattern determiner and applied according to the pattern; an average selector for selecting one of the average operation storage units in response to the selection signal to receive the corresponding cumulative average; and a delta image operation unit for subtracting the cumulative average received by the average operation storage unit selected by the average selector from the digital image signal to generate a delta image signal.

The optical navigation device may further include an image filter for filtering the delta image signal.

In another aspect, the present invention is directed to a method for compensating for an offset in an optical navigation device. The method includes: outputting light and receiving light reflected from a working surface to generate an analog image signal, converting the analog image signal into a digital image signal, and outputting the digital image signal; generating and storing a cumulative average of the digital image signals of respective pixels; subtracting the cumulative average from the digital image signals in the respective pixels to generate a delta image signal; and calculating a motion value using the delta image signal.

Generating and storing the cumulative average may include generating and storing the cumulative average of the digital image signals applied between two points of time.

Generating and storing the cumulative average may include weighting a weight coefficient to the respective digital image signals to generate the cumulative average.

Generating and storing the cumulative average may include generating a new cumulative average using some values of the digital image signal and the cumulative average.

Generating and storing the cumulative average comprises: determining a pattern of the digital image signal and dividing the digital image signals according to the pattern to output the digital image signals; calculating a cumulative average of the digital image signals having the corresponding pattern in response to the digital image signals that are divided according to the pattern; storing the cumulative average of the digital image signals having the corresponding pattern; and selecting and outputting one cumulative average corresponding to the pattern of the digital image signal among the stored cumulative averages.

Determining the pattern of the digital image signal may include comparing the digital image signal with each of the cumulative averages of digital image signals having the respective patterns and generating the cumulative average. When a difference between the digital image signal and each of the cumulative averages of digital image signals having the respective patterns is a predetermined level or higher, a new cumulative average may be calculated.

BRIEF DESCRIPTION OF THE DRAWINGS

The foregoing and other objects, features and advantages of the invention will be apparent from the more particular description of exemplary embodiments of the invention, as illustrated in the accompanying drawings. The drawings are not necessarily to scale, emphasis instead being placed upon illustrating the principles of the invention.

FIGS. 3A and 3B are diagrams illustrating a method of filtering an image using an image filter in the conventional optical navigation device shown in FIG. 2.

FIGS. 6A through 6D are diagrams illustrating a process of generating a delta image using the delta image generator shown in FIG. 5 and a process of filtering an image using an image filter.

DETAILED DESCRIPTION OF THE INVENTION

An optical navigation device and a method for compensating for an offset in the optical navigation device according to the present invention will now be described more fully hereinafter with reference to the accompanying drawings, in which exemplary embodiments of the invention are shown.

Figure 4:
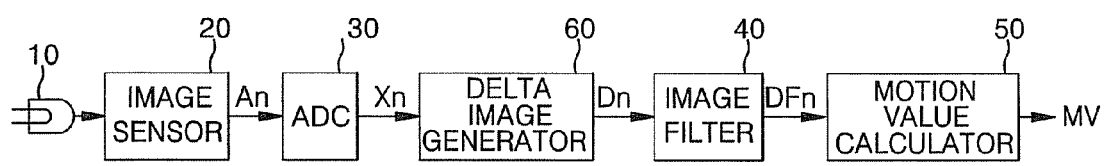
FIG. 4 is a block diagram of an optical navigation device according to an exemplary embodiment of the present invention.

FIG. 4 is a block diagram of an optical navigation device according to an exemplary embodiment of the present invention.

Figure 1:
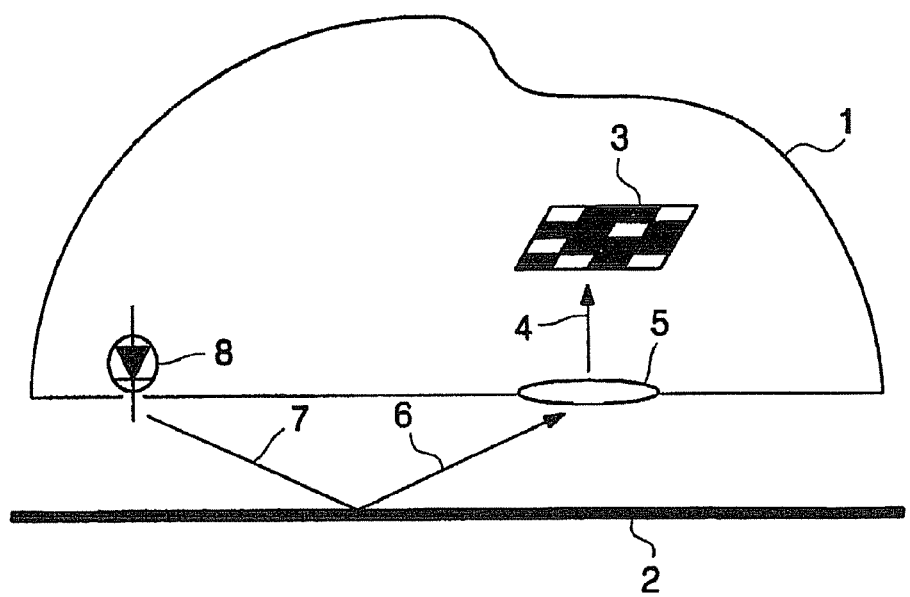
FIG. 1 is a diagram illustrating an image acquiring process of an optical mouse that is an example of a conventional optical navigation device.
Figure 2:
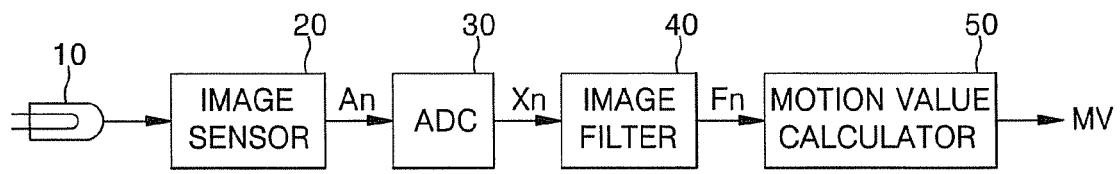
FIG. 2 is a block diagram of a conventional optical navigation device.

Referring to FIGS. 1 and 4, light 7 is emitted from a light source 10, reflected from a subject 2, and projected onto an image sensor 20. Thus, an image sensor 20 having a plurality of pixels accumulates projected light 4 for a sampling period, acquires the image of the subject 2, generates an analog image signal An, and outputs the analog image signal An from each of the pixels. An analog-to-digital (A/D) converter 30 receives the analog image signal An from the image sensor 20, converts the analog image signal An into a digital image signal Xn, and outputs the digital image signal Xn.

A delta image generator 60 calculates a new cumulative average by adding the current applied digital image signal Xn to the cumulative average of the previously applied digital image signals Xn and stores the new cumulative average. Thereafter, the delta image generator 60 subtracts the new cumulative average from the current applied digital image signal Xn and outputs a delta image signal Dn.

When the delta image generator 60 subtracts the new cumulative average from the digital image signal Xn, a signal element caused by an offset is removed from the digital image signal Xn, so that a signal element generated by the subject 2 remains in the delta image signal Dn. Thus, the optical navigation device can clearly recognize a pattern of the subject 2 and calculate a motion value more precisely.

An image filter 40 filters the delta image signal Dn and outputs a delta filtering signal DFn for reducing the amount of data in order to increase the data processing speed of the optical navigation device.

A motion value calculator 50 calculates a correlation between the previous delta filtering signal DFn-1 acquired during the previous sampling period and the current delta filtering signal DFn and outputs a motion value MV of the optical navigation device as a position of the current delta filtering signal DFn that is most correlated with the previous delta filtering signal DFn-1.

Figure 5:
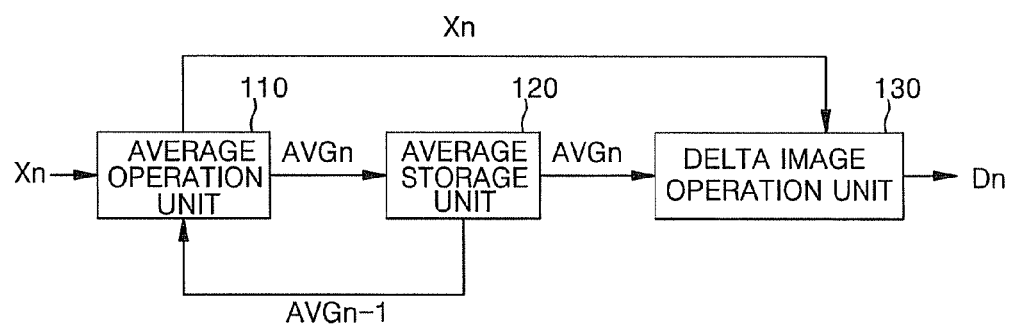
FIG. 5 is a block diagram of an example of a delta image generator shown in FIG. 4.

FIG. 5 is a block diagram of an example of the delta image generator 60 of FIG. 4.

Referring to FIG. 5, the delta image generator 60 includes an average operation unit 110, an average storage unit 120, and a delta image operation unit 130.

When the digital image signal Xn is applied from the A/D converter 30 to the average operation unit 110, the average operation unit 110 receives a cumulative average AVGn-1 of the previous digital image signals Xn from the average storage unit 120, calculates a new cumulative average AVGn, and outputs the cumulative average AVGn.

The average storage unit 120 stores the new cumulative average AVGn instead of the previous cumulative average AVGn<1 in order to calculate a new cumulative average when the next digital image signal Xn+1 is applied to the delta image generator 60.

The delta image operation unit 130 receives the digital image signal Xn and the cumulative average AVGn, subtracts the cumulative average AVGn from the digital image signal Xn, and generates the delta image signal Dn. In this case, the delta image operation unit 130 may add a predetermined value to the digital image signal Xn and subtract the cumulative average AVGn from the addition result.

While processing signals, it is more convenient to calculate positive values more than negative values. Therefore, the predetermined value is pre-added to the digital image signal Xn, and the cumulative average AVGn is subtracted from the digital image signal Xn, so that the delta image signal Dn can have a positive value. However, this process is considered only for the sake of convenience; it is not an absolute necessity.

$$AVGn=(Xn+AVGn-1)/2 \qquad \text{[Formula 1]}$$

$$Dn=Xn-AVGn$$

Formula 1 expresses a process of generating the delta image signal Dn using the delta image generator 60. Specifically, the average operation unit 110 adds the current applied digital image signal Xn to the cumulative average AVGn-1 of the previous digital image signals X0, . . . , and Xn-1, divides the addition result by 2, and generates the new cumulative average AVGn. Also, the delta image operation unit 130 subtracts the new average AVGn from the current applied digital image signal Xn and generates the delta image signal Dn. As described above, the delta image operation unit 130 may add a predetermined value to the digital image signal Xn and subtract the cumulative average AVGn from the addition result.

When the delta image signal Dn is generated in the above-described process, since the deviation of the cumulative average AVGn is large while the process of generating the delta image signal Dn is being performed an initial predetermined number of times, it is difficult to precisely calculate a motion value MV in the optical navigation device. However, when the number of times the process of generating the delta image signal Dn is performed exceeds a predetermined number, only an element caused by an offset appears in the cumulative average AVGn so that a pattern of the current generated digital image signal Xn is marked in the delta image signal Dn. Therefore, the optical navigation device can calculate the motion value MV more precisely.

However, in a case where even the current generated digital image signal Xn is included in the calculation of the cumulative average AVGn as expressed in Formula 1, the pattern of the digital image signal Xn is also included in the calculation of the cumulative average AVGn so that the pattern characteristic of the digital image signal Xn is not strongly marked in the delta image signal Dn. Also, each time the current generated digital image signal Xn is applied, the cumulative average AVGn is calculated again and thus, the operating speed of the optical navigation device decreases.

$$AVGm=(Xm+AVGm-1)/2 \quad \text{[Formula 2]}$$

$$Dn=Xn-AVGm$$

In Formula 1, the delta image generator 60 generates the delta image signal Dn using the cumulative average AVGn of digital image signals including the current applied digital image signal Xn. However, in Formula 2, a cumulative average AVGm of a first digital image signal X1 through an m-th digital image signal Xm is obtained, and the following digital image signals Xm+1, . . . , and Xn are not included in the calculation of the cumulative average AVGm. Here, m is less than n. When the number of times the cumulative average AVGm is obtained exceeds a predetermined number, the cumulative average AVGm varies within only a small range except in some special cases. Accordingly, the cumulative average AVGm of the first through m-th digital image signals X1, . . . , and Xm makes little difference to the cumulative average AVGn of the first digital image signal X1 through the current generated digital image signal Xn. As described above, by calculating only the cumulative average AVGm of the first through m-th digital image signals X1, . . . , and Xm, the optical navigation device may not calculate the cumulative average AVGn each time the current generated digital image signal Xn is applied. As a result, the operating speed of the optical navigation device can increase.

Generally, the optical navigation device has an initialization operation period. During the initialization operation period, the optical navigation device receives a digital image signal Xm a predetermined number of times and inspects an operating state. Therefore, the optical navigation device may calculate the cumulative average AVGm of digital image signals X0, . . . , and Xm during the initialization operation period and generate the delta image signals Dm+1, . . . , and Dn instead of calculating the cumulative average of the following digital image signals Xm+1, . . . , and Xn.

As expressed in Formula 2, since the current digital image signal Xn is not included in the cumulative average AVGm, the pattern of the current digital image signal Xn is more marked in the delta image signal Dn and thus, enabling more precise calculation of the motion value MV.

In Formulas 1 and 2, since it is expressed that only the previous cumulative averages AVGn-1 and AVGm are stored as an infinite impulse response (IIR) type, the memory size of the optical navigation device can be reduced. However, although the importance of previous image signals in the cumulative average AVGn-1 is halved over time, information on all the previous pixels is accumulated in the cumulative average AVGn-1 as expressed in Formula 1. Also, since the cumulative average AVGm as expressed in Formula 2 is obtained as an average of digital image signals generated up to the previous predetermined point in time, the response speed is slow on a time axis. In other words, the digital image signal Xn varies rapidly due to a variation of the subject 2, but the average of digital image signals Xn varies slowly.

$$AVGn=(Xn+(Cn-1 \times Xn-1)+ \ldots +(Cn-p \times Xn-p))/2 \quad \text{[Formula 3]}$$

$$Dn=Xn-AVGn$$

Formula 3 is expressed as a finite impulse response (FIR) type in order to solve the problem of low response speed of the average on a time axis as expressed in Formulas 1 and 2. Specifically, the previous predetermined number "p" of digital image signals Xn-p, . . . , and Xn-1 prior to the present time of point are stored so that each time a new digital image signal Xn is applied, the cumulative average AVGn of the present predetermined number of digital image signals Xn including the new digital image signal Xn is newly calculated. When using the FIR-type method expressed in Formula 3, the response speed of the cumulative average AVGn on a time axis increases. As a result, the cumulative average AVGn also varies at high speed with a rapid variation of the digital image signal Xn. Here, coefficients Cn-1, . . . , and Cn-p that are multiplied by the digital image signals Xn-p, . . . , and Xn-1 are weight coefficients for controlling a rate of the contribution of the previous digital image signals Xn-p, . . . , and Xn-1 to the cumulative average AVGn. Therefore, the variation speed of the cumulative average AVGn can be controlled by adjusting the number of the previous digital image signals Xn-p, . . . , and Xn-1 or the weight coefficients Cn-1, . . . , and Cn-p.

However, in the method expressed in Formula 3, the optical navigation device should always store the previous "p" number of digital image signals Xn-p, . . . , and Xn-1 and the weight coefficients Cn-1, . . . , and Cn-p, the memory size of the optical navigation device should increase, and a time taken to calculate the cumulative average AVGn is longer than in the methods expressed in Formula 1 and 2. However, the above-described problems can be solved by appropriately controlling the number "p" of the previous digital image signals Xn-p, . . . , and Xn-1.

$$AVGm=(Xm+(Cm-1 \times Xm-1)+ \ldots +(Cm-p \times Xm-p))/2 \quad \text{[Formula 4]}$$

$$Dn=Xn-AVGm$$

Formula 3 expresses the calculation of the cumulative average AVGn using the previous "p" number of digital image signals Xn-p, . . . , and Xn, while Formula 4, which is obtained from Formulas 2 and 3, expresses the calculation of an average AVGm using only a "p" number of digital image signals Xn-p, . . . , and Xm prior to the previous predetermined point in time.

FIGS. 6A through 6D are diagrams illustrating a process of generating a delta image using the delta image generator 60 shown in FIG. 5 and a process of filtering an image using an image filter. In FIG. 6A, sequentially applied digital image signals X0, . . . , and X5 are respectively the same as the digital image signals X0, . . . , and X5 of FIG. 3A.

Figure 3A:
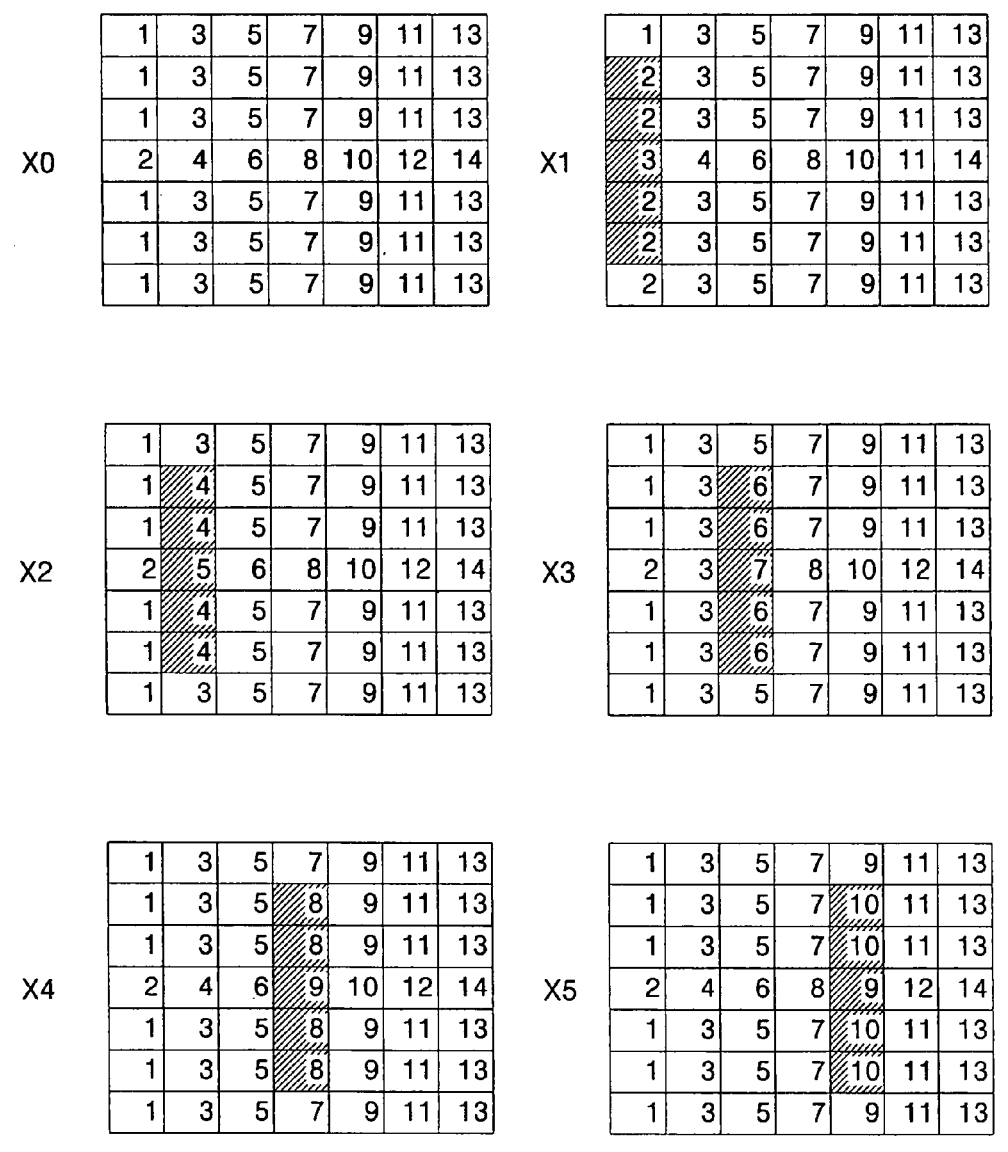

Similar to FIG. 3A, the digital image signals X0, . . . , and X5, cumulative averages AVG0, . . . , and AVG5, delta image signals D0, . . . , and Dn, and delta filtering signals DF0, . . . , and DF5 are expressed as digital image matrices, average matrices, delta image matrices, and delta filtering matrices, respectively, for brevity.

The digital image matrices X0, ..., and X5 of FIG. 6A are arranged in 7 rows and 7 columns. Also, the digital image matrix X0 is an initial digital image matrix in which a right column of the matrix is brighter than a left column thereof due to offsets caused by the above-described offsets of the image sensor 20, lighting offsets, or foreign materials.

As the optical navigation device moves, a predetermined pattern is formed from the left column to the right column in the digital image matrices X1, ..., and X5. Specifically, a predetermined pattern is formed in a first column in the digital image matrix X1, a predetermined pattern is formed in a second column in the digital image matrix X2, and a predetermined pattern is formed in a fifth column in the digital image matrix X5.

When calculating cumulative averages of the digital image matrices X0, and X5 using the method expressed in Formula 1, the average matrices AVG0, and AVG5 are obtained as shown in FIG. 6B. Since an initial average matrix AVG0 has no previous average matrix AVG-1, the initial digital image matrix X0 is equal to the initial average matrix AVG0. A method of calculating the initial average matrix AVG0 is needed when the number of times that the digital image matrices X0, ..., and X5 are input is small, as in the embodiment as illustrated in FIG. 6A. In this case, since there are great deviations in values of the average matrices AVG0, ..., and AVG5, the initial average matrix AVG0 is specified separately. However, due to the fact that a typical optical navigation device receives a large number of digital image matrices Xn, even if the previous average matrix AVG-1 prior to the initial average matrix AVG0 is set to any value, as the number of digital image matrices Xn increases, a difference between the values of the average matrix AVGn gradually decreases.

The average matrices AVG1, ..., and AVG5, except the initial average matrix AVG0, are obtained in the method expressed in Formula 1. Specifically, the average matrices AVG1, ..., and AVG5 are respectively obtained by adding the current applied digital image matrices X1, ..., and X5 to the averages matrices AVG0, ..., and AVG4 of the previously applied digital image matrices X0, ..., and X4 and dividing the addition result by 2. For example, the average matrix AVG4 is obtained by adding the digital image matrix X4 to the average matrix AVG3 and dividing the addition result by 2.

The delta image matrices D0, ..., and D5 of FIG. 6C are respectively obtained by subtracting the average matrices AVG0, ..., and AVG5 from the digital image matrices X0, ..., and X5. However, in this process, the delta image matrices D0, ..., and D5 may have negative values. While processing signals as described above, it is more convenient to calculate positive values than negative values. Therefore, a predetermined value (e.g., 2) is pre-added to the digital image matrices X0, ..., and Xn, and the average matrices AVG0, ..., and AVGn are subtracted from the digital image signals X0, ..., and Xn so that the delta image matrices D0, ..., and D5 may have positive values. Since the delta image matrices D0, ..., and D5 are obtained by subtracting the average matrices AVG0, ..., and AVG5 from the digital image matrices X0, ..., and X5, respectively, the delta image matrices D0, ..., and D5 correspond to signals from which offset signal elements of the optical navigation device are removed.

The image filter 40 of FIG. 4 receives the delta image matrices D0, ..., and D5 and outputs the delta filtering matrix DF0, ..., and DF5 having 1-bit image quality. That is, the image filter 40 outputs "1" when a value obtained by subtracting a value of a left cell from a value of each cell of the delta image matrix D0, ..., and D5 is greater than "0", and outputs "0" when the obtained value is less than or equal to "0".

On comparing the delta filtering matrices DF0, ..., and DF5 of FIG. 6D with the filtering matrices F0, ..., and F5 of FIG. 3B, even if the motion of the optical navigation device leads to variations in the patterns of the digital image matrices X0, ..., and X5, no changes are made to the filtering matrices F0, ..., and F5 of FIG. 3B due to offsets. As a result, the optical navigation device cannot calculate the motion value MV. In comparison, the delta filtering matrices DF0, ..., and DF5 are obtained by previously removing the offset signal elements from the delta image matrices D0, ..., and D5 and filtering the delta image matrices D0, ..., and D5, the patterns of the digital image matrices X0, ..., and X5 are varied so that the optical navigation device can easily calculate the motion value MV.

However, as can be seen from the delta filtering matrices DF0 and DF1, when the number of digital image matrices X0 and X1 that are accumulated to obtain the cumulative average AVGn is small, the deviations of the averages AVG0 and AVG1 are large and the averages AVG0 and AVG1 may not be offset signal elements, so that it is difficult to precisely calculate the motion value MV in the optical navigation device. This is because the cumulative average AVGn calculated for an initial predetermined number of times may include not only a signal element caused by an offset but also a signal element caused by the characteristics of the subject 2. For example, when the subject 2 (or the surface of a worktable) does not form a planar surface and its reflection rate is higher near an edge than in the center, the digital image signal Xn is generated in the same shape as the initial digital image matrix D0.

The foregoing offset in an initial motion value MV can be solved by receiving the digital image signal Xn and calculating a cumulative average AVGn a sufficient number of times, for example, 100 times, during the initialization operation of the optical navigation device.

In FIG. 6B, the average matrices AVG0, ..., and AVG5 are obtained using all elements of matrices, that is, all pixels. When calculating the average matrices AVG0, ..., and AVG5 using all the pixels, the optical navigation device requires a great memory size and operates at low speed.

Figure 7A:
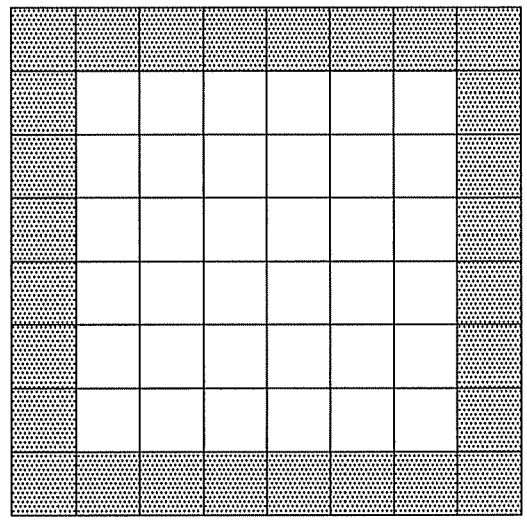
FIGS. 7A and 7B are diagrams illustrating a method for simplifying the calculation of the average.
Figure 7B:
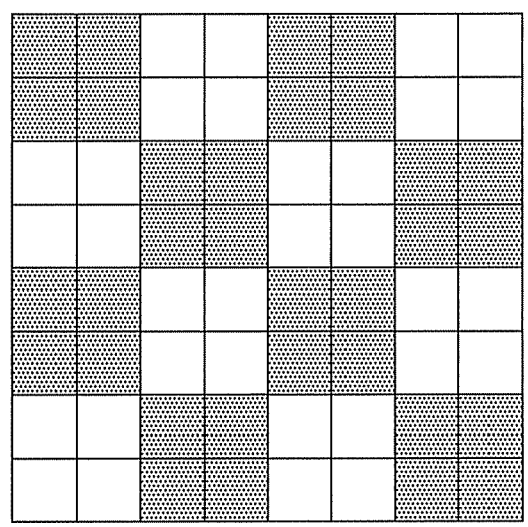

In order to overcome these drawbacks, a method for simplifying the calculation of the average is illustrated in FIGS. 7A and 7B. FIG. 7A illustrates a method for estimating the average of all elements of an average matrix by calculating the average of only edge elements of the average matrix. In this method, an offset due to the non-uniformity of light emitted from a light source can be compensated for. However, it becomes difficult to compensate for offsets caused by defects or gains of pixels. Also, the method as illustrated in FIG. 7A may be applied only to a case where a pattern of a subject is generally uniform.

FIG. 7B illustrates a method of dividing pixels of an average matrix into block units and calculating the average of a predetermined number of pixels included in the corresponding block in order to make up for the problem of the method of FIG. 7A and simplify a process of calculating the average. Like in FIG. 7B, when four pixels are defined as a block, the memory size of an optical navigation device can be reduced to ¼ and the operating speed thereof can increase.

Figure 8:
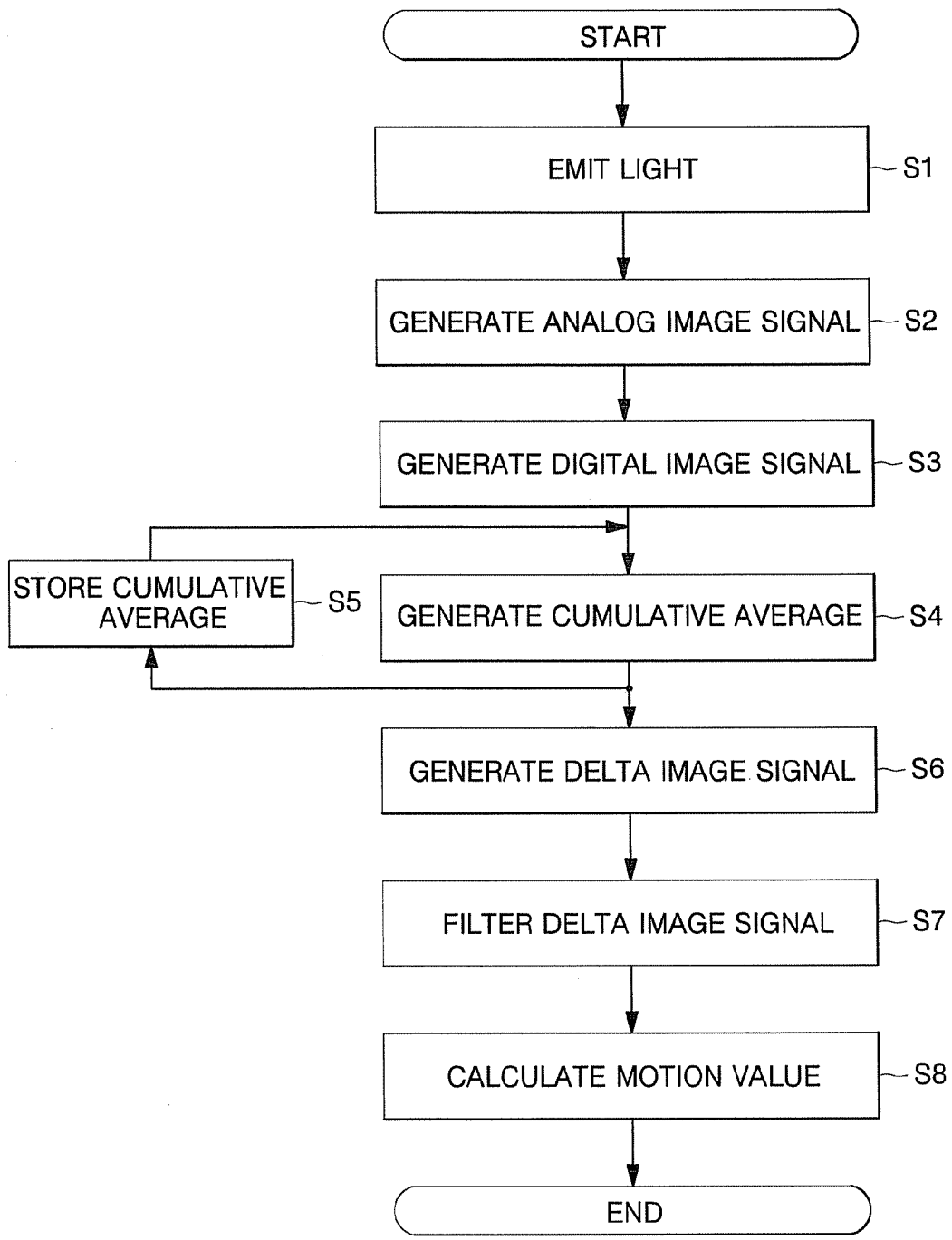
FIG. 8 is a flowchart illustrating the operation of the optical navigation device shown in FIG. 4.

FIG. 8 is a flowchart illustrating the operation of the optical navigation device shown in FIG. 4.

Initially, the operation of the optical navigation device will be described according to the method expressed in Formula 1 with reference to FIGS. 4, 5, and 8. When power is supplied to the optical navigation device, the light source 10 emits light in operation S1. When the emitted light is reflected from the subject 2 and projected onto the image sensor 20 through the lens, the image sensor 20 having a plurality of pixels generates an analog image signal An in operation S2.

The A/D converter 30 converts the analog image signal An into a digital image signal Xn in operation S3.

The average operation unit 110 of the delta image generator 60 adds the current applied digital image signal Xn to the cumulative average of the previously applied digital image signals X0 . . . , and Xn-1, divides the addition result by 2, and generates a new cumulative average AVGn in operation S4.

The new cumulative average AVGn is stored in the average storage unit 120 and applied to the delta image operation unit 130 in order to generate a delta image signal Dn in operation S5.

The delta image operation unit 130 receives the new cumulative average AVGn and the digital image signal Xn, subtracts the new cumulative average AVGn from the digital image signal Xn, and generates and outputs the delta image signal Dn in operation S6.

The image filter 40 filters the delta image signal Dn in a preset method and generates a delta filtering signal DFn to reduce the data processing amount in operation S7.

The motion value calculator 50 calculates a motion value using the delta filtering signal DFn and outputs the motion value in operation S8. Since a method of calculating the motion value using the motion value calculator 50 is known to one skilled in the art, a description thereof will not be presented here.

Hereinafter, the operation of the optical navigation device will be described according to the method expressed in Formula 2. When power is supplied to the optical navigation device, the light source 10 emits light in operation S1. When the emitted light is reflected from the subject 2 and projected onto the image sensor 20 through the lens, the image sensor 20 having a plurality of pixels generates an analog image signal An in operation S2.

The A/D converter 30 converts the analog image signal An into a digital image signal Xn in operation S3.

The average operation unit 110 determines the number of times the generated digital image signal Xn is applied, generates a cumulative average AVGn when the number of times the digital image signal Xn is applied is less than or equal to a predetermined number "m", and outputs the cumulative average AVGn to the average storage unit 120 and the delta image operation unit 130 (not shown). When the number of times the digital image signal Xn is applied is greater than the predetermined number "m", since it is unnecessary to generate a new average, the average operation unit 110 directly outputs the digital image signal Xn to the delta image operation unit 130 (not shown).

The delta image operation unit 130 subtracts an average AVGm stored in the average storage unit 120 from the digital image signal Xn and generates the delta image signal Dn in operation S6.

The image filter 40 filters the delta image signal Dn in a preset method and generates a delta filtering signal DFn to reduce the data processing amount in operation S7.

The motion value calculator 50 calculates a motion value using the delta filtering signal DFn and outputs the motion value in operation S8.

In the method expressed in Formula 2, the average operation unit 110 further includes a counter to determine the number of times the digital image signal Xn is applied. Thus, when the number of times the digital image signal Xn is applied is less than or equal to the predetermined number "m", the average operation unit 110 generates a new average AVGn in the same method as expressed in Formula 1, and the delta image operation unit 130 subtracts the cumulative average AVGn from the digital image signal Xn to generate the delta image signal Dn. However, when the number of times the digital image signal Xn is applied is greater than the predetermined number "m", the average operation unit 110 does not generate the cumulative average AVGn so that the delta image operation unit 130 subtracts the cumulative average AVGm of digital image signals X0, . . . , and Xm from the digital image signal Xn to generate the delta image signal Dn.

Figure 9:
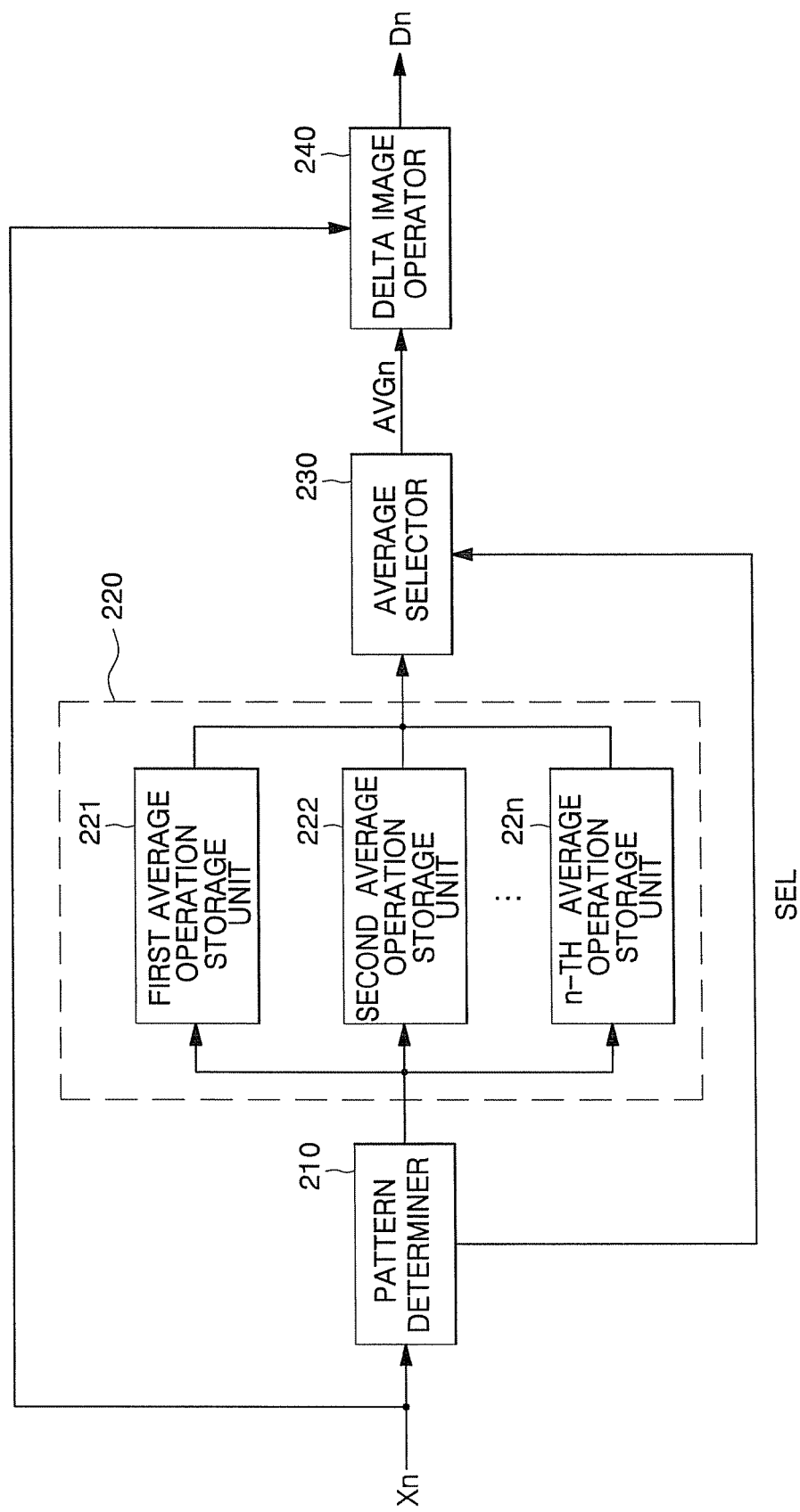
FIG. 9 is a block diagram of another example of the delta image generator shown in FIG. 4.

FIG. 9 is a block diagram of another example of the delta image generator shown in FIG. 4.

As described above with reference to Formula 2, the cumulative average AVGn of the optical navigation device varies within only a small range except in some special cases. However, in some cases, the cumulative average AVGn may vary greatly so that malfunctions may occur in the optical navigation device. For example, the cumulative average AVGn may sharply vary when foreign materials, such as dust, enter a light incidence path in the optical navigation device or when the subject 2 (or the surface of the worktable) is changed. In the optical navigation device, when the foreign materials, such as dust, enter the light incidence path, light is not properly incident on the image sensor 20 and thus, greatly affecting the subsequently calculated average. Similarly, in an optical navigation device that used to recognize a pattern of a black subject, when the black subject is changed to a white subject, the pattern of the black subject that reflects light emitted from the light source 10 is suddenly changed and thus, affecting the cumulative average AVGn of the optical navigation device.

Therefore, the delta image generator 60 of FIG. 9 includes a plurality of average operation storage units 221, 222, . . . , and 22n so that the optical navigation device can handle a sudden variation in the cumulative average AVGn.

When the A/D converter 30 applies the digital image signal Xn, a pattern determiner 210 analyzes a pattern of the applied digital image signal Xn. The pattern determiner 210 analyzes the pattern of the digital image signal Xn based on variations of light intensity, an image, and a correlation, determines one of the average operation storage units 221, 222, . . . , and 22n suited to the corresponding pattern, and applies the digital image signal Xn to the selected average operation storage unit. When the current digital image signal Xn wholly or partially increases to at least a predetermined level more than the previous digital image signal Xn-1 or decreases to at least a predetermined level less than the previous digital image signal Xn-1, the pattern determiner 210 determines that the pattern of the digital image signal Xn is changed.

Specifically, the pattern determiner 210 recognizes the pattern of the first digital image signal X0 and applies the digital image signal X0 to the first average operation storage unit 221. When a pattern of the second digital image signal X1 is similar to that of the first digital image signal X0, the pattern determiner 210 applies the digital image signal X1 to the first average operation storage unit 221.

When a difference in pattern between the third digital image signal X2 and the first digital image signal X0 is a predetermined level or higher, the pattern determiner 210 applies the digital image signal X2 to the second average operation storage unit 222. Thereafter, the pattern determiner 210 analyzes patterns of the subsequent digital image signals X3, . . . , and Xn and transmits the digital image signals X3, . . . , and Xn to the corresponding average operation storage units 221, 222, . . . , and 22n in the same manner as described above. As a result, the average operation storage units 221, 222, ..., and 22n calculate the averages AVGn of the digital image signals Xn having similar patterns and stores the averages.

Also, the pattern determiner 210 outputs information on the average operation storage units 221, 222, ..., and 22n, which are selected in the pattern determination process, as selection signals SEL to an average selector 230.

Each of the average operation storage units 221, 222, ..., and 22n includes the average operation unit 110 and average storage unit 120 as described with reference to FIG. 5 to calculate and store the cumulative average AVGn of the digital image signals Xn having the corresponding pattern.

The average selector 230 selects one of the average operation storage units 221, 222, ..., and 22n in response to the selection signal SEL from the pattern determiner 210, receives the cumulative average AVGn from the selected average operation storage unit, and transmits the cumulative average AVGn to a delta image operator 240.

The delta image operator 240 subtracts the cumulative average AVGn from the digital image signal Xn and outputs a delta image signal Dn.

In conclusion, the delta image generator 60 of FIG. 9 determines the pattern of the digital image signal Xn and separately calculates and stores the average of digital image signals Xn having similar patterns. Also, the delta image generator 60 selects the cumulative average AVGn of the digital image signals Xn having similar patterns to the current applied digital image signal Xn so that the delta image operator 240 generates the delta image signal Dn. As a result, the delta image generator 60 can compensate for a sudden variation in the cumulative average AVGn caused by foreign materials or a subject.

In the delta image generator 60 of FIG. 9, the pattern determiner 210 may select one of the average operation storage units 221, 222, ..., and 22n based on, for example, light intensity. In this case, when light intensity is high, the respective pixels of an image sensor of the optical navigation device have non-uniform outputs. The image sensor of the optical navigation device includes an electrical shutter to restrict the output of each of the pixels within a constant range, so that the intensity of incident light can be sensed using the electrical shutter. Since the image sensor uses the electrical shutter instead of a physical shutter, even if the electrical shutter is turned off, light is continuously incident on the image sensor, so that the uniformity of the outputs of the pixels continuously deteriorates. However, the pattern determiner 210 may be preset to select one of the average operation storage units 221, 222, ..., and 22n based on the amount of time that the electrical shutter is turned off. In this case, the delta image generator 60 can calculate the cumulative average AVGn according to the light intensity and compensate for the non-uniformity of the outputs of the pixels of the image sensor. Also, when light intensity is low, offsets between the pixels of the image sensor can be compensated for in the same manner.

In another example, the pattern determiner 210 may select one of the average operation storage units 221, 222, ..., and 22n based on image variations according to the method expressed in Formula 3. When the optical navigation device is embodied by an optical mouse, a mouse pad may be typically used as a subject. When the mouse pad has generally uniform brightness, the pattern determiner 210 selects one of the average operation storage units 221, 222, ..., and 22n so as to increase the number "p" of the previous digital image signals Xn-p, ..., and Xn-1 or approximate each of the weight coefficients Cn-1, ..., and Cn-p to 1 in Formula 3, so that the cumulative average AVGn may vary slowly. When the mouse pad has a clear contrast between light and darkness, the pattern determiner 210 selects one of the average operation storage units 221, 222, ..., and 22n so as to decrease the number "p" of the previous digital image signals Xn-p, ..., and Xn-1 or lessen each of the weight coefficients Cn-1, ..., and Cn-p in Formula 3, so that the cumulative average AVGn may vary rapidly. As a result, the pattern determiner 210 selects one of the average operation storage units 221, 222, ..., and 22n, which depends on the previous digital image signals Xn-p, ..., and Xn-1 according to the image pattern of the subject, to select the cumulative average AVGn suited to the corresponding pattern.

The delta image generator 60 of FIG. 4 also may further include the pattern determiner 210 similar to the delta image generator 60 of FIG. 9. In this case, when the current digital image signal Xn sharply increases to at least a predetermined level more than the previous digital image signal Xn-1 or sharply decreases to at least a predetermined level less than the previous digital image signal Xn-1, the pattern determiner 210 may delete the existing average and take a new average. Thus, the delta image generator 60 of FIG. 4 can obtain almost the same effect as the delta image generator 60 of FIG. 9.

Likewise, the average operation storage units 221, 222, ..., and 22n of FIG. 9 also may store only the average of a predetermined number of digital image signals in order to prevent the average of digital image signals having similar patterns from being continuously calculated. As a result, the operating speed of the optical navigation device can increase.

Generally, since a digital camera also adopts an image sensor, the digital camera has similar problems to the optical navigation device. The digital camera uses a correlated double sampling (CDS) circuit to remove thermal noise and fixed pattern noise from pixels. A CDS method finds a pure signal level from a difference between a reference value and a signal value in order to remove noise generated when an image is output from a pixel of an image sensor. However, the digital camera determines a motion, unlike the optical navigation device for searching a motion. Also, since the CDS method is a technique for compensating for an offset in an analog manner, the CDS circuit neither accumulates the averages of digital image signals Xn nor compares two averages. Further, the CDS circuit cannot compensate for a difference between gains of the respective pixels of the image sensor.

According to the present invention as described above, in an optical navigation device and a method for compensating for an offset in the optical navigation device, the average of digital image signals is accumulated and subtracted from the current applied digital image signal and thus, compensating for an offset caused by non-uniform light, an offset caused by a difference between gains of pixels of an image sensor, and malfunctions in the optical navigation device due to a sudden variation of a subject or the inflow of foreign materials such as dust.

Exemplary embodiments of the present invention have been disclosed herein and, although specific terms are employed, they are used and are to be interpreted in a generic and descriptive sense only and not for purpose of limitation. Accordingly, it will be understood by one of ordinary skill in the art that various changes in form and details may be made without departing from the spirit and scope of the present invention as set forth in the following claims.

What is claimed is:

1. An optical navigation device comprising:
   an image input unit for emitting light, receiving light reflected from a working surface to generate an analog image signal for respective pixels, converting the analog image signals into digital image signals, and outputting the digital image signals;

a delta image generator for receiving the digital image signals, generating a cumulative average for the digital image signals received for a predetermined period of time with respect to each pixel, and subtracting the cumulative average from the digital image signal in the respective pixels to generate a delta image signal for the respective pixels; and a motion value calculator for calculating a motion value using the delta image signals, wherein the delta image generator comprises:

an average operation unit for calculating the cumulative average of the digital image signals applied for the predetermined period of time with respect to each pixel to output the cumulative average;

an average storage unit for storing the cumulative average output from the average operation unit to output the cumulative average to the average operation unit when a next digital image signal is applied to the average storage unit; and a delta image operation unit for subtracting the cumulative average from the digital image signal in the respective pixels to generate the delta image signal for the respective pixels, wherein the average operation unit generates a new cumulative average using only edge elements of the digital image signal and the cumulative average that are arranged in an m×n matrix.

2. The device according to claim 1, wherein the average operation unit calculates the cumulative average of all the digital image signals applied between a time point at which a predetermined time elapses after the digital image signal is applied and a time point at which a current digital image signal is applied.

3. The device according to claim 1, wherein the average operation unit calculates the cumulative average of all the digital image signals applied between a time point at which a predetermined time elapses after the digital image signal is applied and a time point at which a predetermined number of digital image signals are applied.

4. The device according to claim 1, wherein the average operation unit calculates the cumulative average of all the digital image signals applied between a time point at which the current digital image signal is applied and a time point at which a predetermined number of previous digital image signals are applied.

5. The device according to claim 1, wherein the average operation unit adds a weight coefficient to the respective digital image signals to generate the cumulative average.

6. The device according to claim 5, wherein the average operation unit controls a variation of the cumulative average by adjusting the number of digital image signals and the weight coefficient.

7. The device according to claim 1, wherein the delta image operation unit adds a predetermined value to one of the digital image signal and the delta image signal to prevent the delta image signal from having a negative value.

8. The device according to claim 1, wherein the image input unit comprises:

a light source for emitting light;

an image sensor including the pixels and for accumulating light which is emitted from the light source and reflected from the working surface for a sampling period to generate the analog image signal and output in one pixel unit; and an analog-to-digital (A/D) converter for receiving the analog image signal and converting the analog image signal into a digital image signal to output the digital image signal.

9. The device according to claim 1, further comprising an image filter for filtering the delta image signal.

10. The device according to claim 1, wherein the optical navigation device compensates for an offset caused by non-uniformity of the light emitted from the light source.

11. The device according to claim 1, wherein the optical navigation device compensates for an offset caused by a difference between gains of the respective pixels of the image sensor.

12. An optical navigation device comprising:

an image input unit for emitting light, receiving light reflected from a working surface to generate an analog image signal for respective pixels, converting the analog image signals into digital image signals, and outputting the digital image signals;

a delta image generator for receiving the digital image signals, generating a cumulative average for the digital image signals received for a predetermined period of time with respect to each pixel, and subtracting the cumulative average from the digital image signal in the respective pixels to generate a delta image signal for the respective pixels; and a motion value calculator for calculating a motion value using the delta image signals, wherein the delta image generator comprises:

an average operation unit for calculating the cumulative average of the digital image signals applied for the predetermined period of time with respect to each pixel to output the cumulative average;

an average storage unit for storing the cumulative average output from the average operation unit to output the cumulative average to the average operation unit when a next digital image signal is applied to the average storage unit; and a delta image operation unit for subtracting the cumulative average from the digital image signal in the respective pixels to generate the delta image signal for the respective pixels, wherein the average operation unit generates a new cumulative average using some values of the digital image signal and the cumulative average, and wherein the average operation unit divides the digital image signal and the cumulative average, which are arranged in an m×n matrix, into block units and generates the new cumulative average of each of the block units.

13. A method for compensating for an offset in an optical navigation device, the method comprising:

outputting light and receiving light reflected from a working surface to generate an analog image signal for respective pixels, converting the analog image signals into digital image signals, and outputting the digital image signals;

generating and storing a cumulative average of the digital image signals received for a predetermined period of time with respect to each pixel;

subtracting the cumulative average from the digital image signal in the respective pixels to generate a delta image signal for the respective pixels; and calculating a motion value using the delta image signals, wherein generating and storing the cumulative average comprises generating a new cumulative average using only edge elements of the digital image signal and the cumulative average that are arranged in an m×n matrix.

14. The method according to claim 13, wherein generating and storing the cumulative average comprises generating and storing the cumulative average of all the digital image signals applied between a time point at which a predetermined time elapses after the digital image signal is applied and a time point at which a current digital image signal is applied.

15. The method according to claim 13, wherein generating and storing the cumulative average comprises generating and storing the cumulative average of all the digital image signals applied between a time point at which a predetermined time elapses after the digital image signal is applied and a time point at which a predetermined number of digital image signals are applied.

16. The method according to claim 13, wherein generating and storing the cumulative average comprises generating and storing the cumulative average of all the digital image signals applied between a time point at which the current digital image signal is applied and a time point at which a predetermined number of previous digital image signals are applied.

17. The method according to claim 13, wherein generating and storing the cumulative average comprises weighting a weight coefficient to the respective digital image signals to generate the cumulative average.

18. The method according to claim 13, wherein generating the delta image signal comprises adding a predetermined value to one of the digital image signal and the delta image signal to prevent the delta image signal from having a negative value.

19. The method according to claim 13, further comprising filtering the delta image signal.

20. A method for compensating for an offset in an optical navigation device, the method comprising:
   outputting light and receiving light reflected from a working surface to generate an analog image signal for respective pixels, converting the analog image signals into digital image signals, digital image signals;
   generating and storing a cumulative average of the digital image signals received for a predetermined period of time with respect to each pixel;
   subtracting the cumulative average from the digital image signal in the respective pixels to generate a delta image signal for the respective pixels; and
   calculating a motion value using the delta image signals,
   wherein generating and storing the cumulative average comprises generating a new cumulative average using some values of the digital image signal and the cumulative average; and
   wherein generating and storing the cumulative average comprises sectioning the digital image signal and the cumulative average, which are arranged in an m×n matrix, into block units and generating the new cumulative average of each of the block units.

* * * * *